US012486677B2

(12) United States Patent
Drown

(10) Patent No.: US 12,486,677 B2
(45) Date of Patent: Dec. 2, 2025

(54) FLOORING TOOL

(71) Applicant: Doug Drown, Manassas, VA (US)

(72) Inventor: Doug Drown, Manassas, VA (US)

( * ) Notice: Subject to any disclaimer, the term of this patent is extended or adjusted under 35 U.S.C. 154(b) by 703 days.

(21) Appl. No.: 17/645,531

(22) Filed: Dec. 22, 2021

(65) Prior Publication Data
US 2023/0193640 A1 Jun. 22, 2023

(51) Int. Cl.
E04F 21/22 (2006.01)

(52) U.S. Cl.
CPC .................... *E04F 21/22* (2013.01)

(58) Field of Classification Search
CPC ....................................... E04F 21/22
USPC ............................................. 81/46
See application file for complete search history.

(56) References Cited

U.S. PATENT DOCUMENTS

| 148,136 | A | * | 3/1874 | Parmele | B23D 51/01 |
| | | | | | 30/520 |
| 1,161,207 | A | | 11/1915 | Hagel | |
| 1,586,906 | A | | 6/1926 | Elias | |
| 2,654,408 | A | * | 10/1953 | Leslie | F16B 9/01 |
| | | | | | 403/68 |
| 2,783,798 | A | | 3/1957 | Morris | |
| 4,064,588 | A | * | 12/1977 | Cooper | E04F 21/0084 |
| | | | | | 15/236.08 |
| 5,486,321 | A | * | 1/1996 | Spatenka | B60S 5/00 |
| | | | | | 425/12 |
| 5,768,793 | A | * | 6/1998 | Fields | G01B 5/02 |
| | | | | | 52/749.11 |
| 5,881,531 | A | | 3/1999 | Bitner | |
| 5,984,271 | A | | 11/1999 | Ellenberger | |
| 6,023,811 | A | * | 2/2000 | Ciarrocchi | E04F 21/165 |
| | | | | | 15/236.08 |
| 6,604,768 | B2 | * | 8/2003 | Stevenson | B28C 7/16 |
| | | | | | 294/49 |
| 12,000,160 | B1 | * | 6/2024 | Nichols, Jr. | E04F 21/22 |
| 2010/0180529 | A1 | | 7/2010 | Drannikov | |
| 2012/0297702 | A1 | | 11/2012 | Hughey et al. | |
| 2019/0257095 | A1 | * | 8/2019 | O'Connor | B25B 27/02 |
| 2020/0102759 | A1 | | 4/2020 | Apt | |

OTHER PUBLICATIONS

PCT International Search Report, international appl. No. PCT/US2022/081790, issued Apr. 4, 2023.
PCT Written Opinion of the International Searching Authority, international appl. No. PCT/US2022/081790, issued Apr. 4, 2023.
Wikipedia, "Laminate flooring", date last edited Oct. 10, 2021.

* cited by examiner

*Primary Examiner* — Hadi Shakeri
(74) *Attorney, Agent, or Firm* — Stonebridge IP, PLLC

(57) ABSTRACT

The disclosure provides a flooring tool including two or more block members each having a length, a width, and a depth, attached to another block member, one or more attachments for holding the block members together, two block members comprising a gap between them, the gap between about ¼ inch to about 1.5 inches wide, one or more attachments for holding a piece of flooring between two block members in the gap and wherein the two block members comprising the gap are between about 8 inches to about 24 inches long, about 1 inch to about 6 inches wide, and about 1 inch to about 6 inches thick.

5 Claims, 4 Drawing Sheets

FLOORING TOOL

BACKGROUND

Technical Field of the Invention

The invention relates to tools used in the installation of mechanical locking systems or snap together flooring, including laminate, vinyl, and wood flooring.

Description of the Related Art

Flooring, including wood flooring, vinyl flooring, and laminate flooring, is often provided in planks, scraps, or pieces, etc., which can be of various sizes, shapes, and geometric configurations. The planks, scraps, pieces, etc., are often installed by inserting or clicking the flooring pieces into one another. For example, there may be tongue in groove type connectors on respective pieces which allows the flooring pieces to be mechanically fastened, inserted or clicked into one another. Other connection similar connection systems are also used.

Generally, during installation, the respective planks, scraps, pieces, etc., must be hammered into place using some form of blunt force. The blunt force may, for example, come from a hammer or mallet and may further utilize a tapping block. Nevertheless, the blunt force used to insert the pieces into one another frequently results in damage to the flooring pieces. For example, the pieces may be dented, bent, or disfigured by the blunt force. The use of a tapping block does not prevent this type of damage to flooring during installation.

SUMMARY DISCLOSURE OF THE INVENTION

This disclosure provides a flooring tool including two or more block members each having a length, a width, and a thickness or depth, attached to another block member, one or more attachments for holding the block members together, two block members comprising a gap between them, the gap between about ⅛ inch to about 1.5 inches wide, one or more attachments for holding a piece of flooring between two block members in the gap and wherein the two block members comprising the gap are between about 8 inches to about 24 inches long, about 1 inch to about 6 inches wide, and about 1 inch to about 6 inches thick.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

Figure 1:
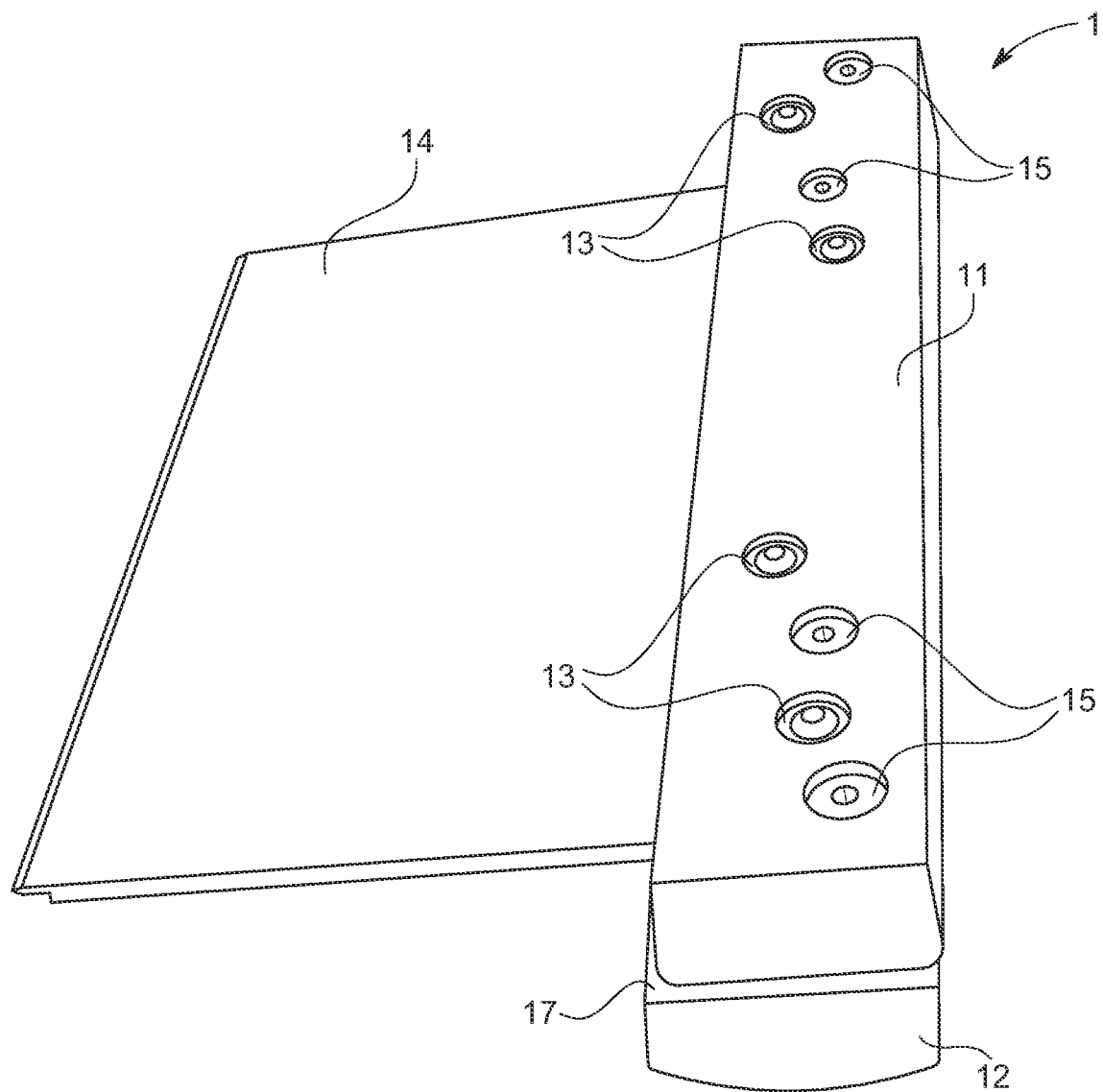
FIG. 1 shows an embodiment of a flooring tool of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

MODES FOR CARRYING OUT THE INVENTION

The disclosed flooring tool is used to protect a piece of flooring during installation. The tool provides a sturdy connection utilizing a piece of flooring itself to apply the pressure needed to seat flooring pieces together, for example, using the clasp of the material without damage to the flooring.

In embodiments, the disclosed flooring tool includes a plurality of block members attached to each other. For example, in one embodiment, the disclosed flooring tool includes two block members that extend the width of a flooring piece, or more, and that are attached together. The dimensions of the block members may be, for example, essentially rectangular. In embodiments, the block members may be of different geometric shapes in order to accommodate various geometries of flooring pieces. The block members may extend the length of a flooring piece or more and be disposed on both sides of the flooring piece when in use.

As mentioned, it is preferable for the length of the block members to extend the full width of a side of a flooring piece that is preferably opposite to the side that is being attached or seated to an adjacent flooring piece. In embodiments, the block members may extend a length greater than a full width of a flooring piece. The relevant width of a flooring piece would generally be a side to which blunt force will be applied to seat or attach the flooring piece during installation. The block members further extend some distance, typically at least several inches, on both sides of the flooring piece when in use.

The flooring tool is long enough to extend substantially the length of a flooring piece and is disposed on both sides of a flooring piece when in use to hold the flooring piece during installation. The flooring tool thus protects the integrity of the entire flooring piece from damage during installation. This represents a significant improvement over tapping blocks which exert significant blunt force to relatively small regions of a flooring piece and do not prevent blunt force damage to a flooring piece during installation.

In embodiments, the length of a block member of the disclosure may range from about 6 inches to about 20 inches. Preferably, the range may be about 8 inches to 12 inches long. The width may range from about one half an inch to about 6 inches, preferably, from about ½ inch to 2 inches. The depth may range from about 1 inch to about 6 inches, preferably about 2 to 4 inches. Block members may be attached to each other with a small gap or slot in between to fit or seat a flooring piece.

The block members may be attached to each other in a variety of ways including by way of example, screws, clamps, quick release connectors, glue, and generally any fasteners capable of attaching two block members together or holding a flooring piece in place for installation. Examples may include thumbscrews and hand turn fasteners, attachment screws, clamps, connectors, fasteners, etc. and may be present on one, two, or up to all block members.

As mentioned, a gap or slot is typically present between two block members in order to accommodate or hold a flooring piece for installation. The gap may range from about ⅛ inch to about 1.5 inches sufficient to accommodate standard flooring pieces, for example, laminate, vinyl, and hardwood flooring pieces. A flooring piece may be placed in the gap and then held by attachment mechanisms as described above.

Attachment mechanisms may also be used to hold a piece of flooring to the block members. For example, one or more screws, hand screws, thumb screws, turn fasteners, or attachment mechanisms as described above may be used. In embodiments, one or more attachment mechanisms may be used to hold block members together and one or more attachment mechanisms may be used to hold a piece of flooring in the gap. For example, one or more screws may be used all the block members together and one or more screws, thumb screws, turn fasteners, etc., may be used to hold a piece of flooring in place.

The flooring tool can be attached to a piece of flooring during installation to protect it from damage while using, for example, a hammer, mallet, or some other blunt force mechanism to hit a piece of flooring to attach flooring pieces together. The flooring tool essentially uses the flooring itself to protect the flooring.

Wood, plastic, metal, carbon fiber, composites, or any like material can be used to make the block. Screws, nails, clamps, glue, quick release fasteners, or any like fasteners, including hand turn fasteners and screws can be used for attaching block members. In preferred embodiments, fasteners, screws, and connectors, may be metal, plastic, composite, wood, or other materials commonly used for the manufacture of screws. The tool can be used on any laminate, wood, or vinyl, snap together flooring system.

FIG. 1 shows an embodiment of a flooring tool 1 of the disclosure. FIG. 1 shows a block member 11 and block member 12 attached together via screws 13 with gap 17 between them. The flooring tool is shown holding a flooring piece 14. Holes 15 may be used to attach screws in different locations in the block members to accommodate various flooring pieces. Screws 13 may hold block members together and different screws 13 may hold the piece of flooring 14 in place.

Figure 2:
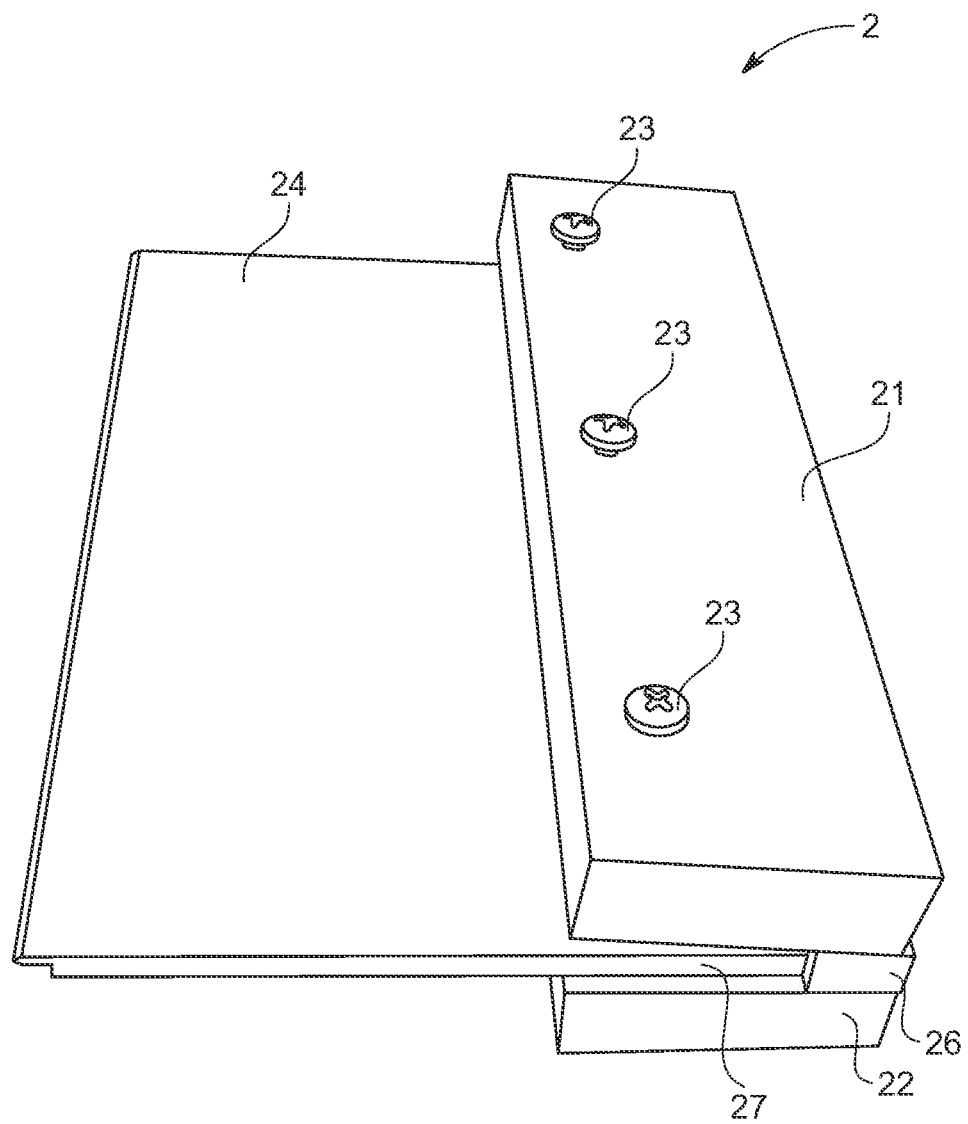
FIG. 2 shows another embodiment of a flooring tool of the disclosure.

FIG. 2 shows another embodiment of a flooring tool 2 of the disclosure. FIG. 2 shows block members 21 and 22 along with attachment screws 23 and gap or slot 27. FIG. 2 shows a block member 26 disposed between block members 21 and 22 and configured to further protect the flooring piece from damage during installation. Block member 26 may be made from the same material as block members 21 and 22 or a different material. In embodiments, block members 21, 22, and 26 may also be integrally formed and thus essentially comprise one piece.

Generally speaking, all of the block members for a particular flooring tool may be made of the same material. In embodiments, however, each block member may also be made from different materials as well.

Figure 3:
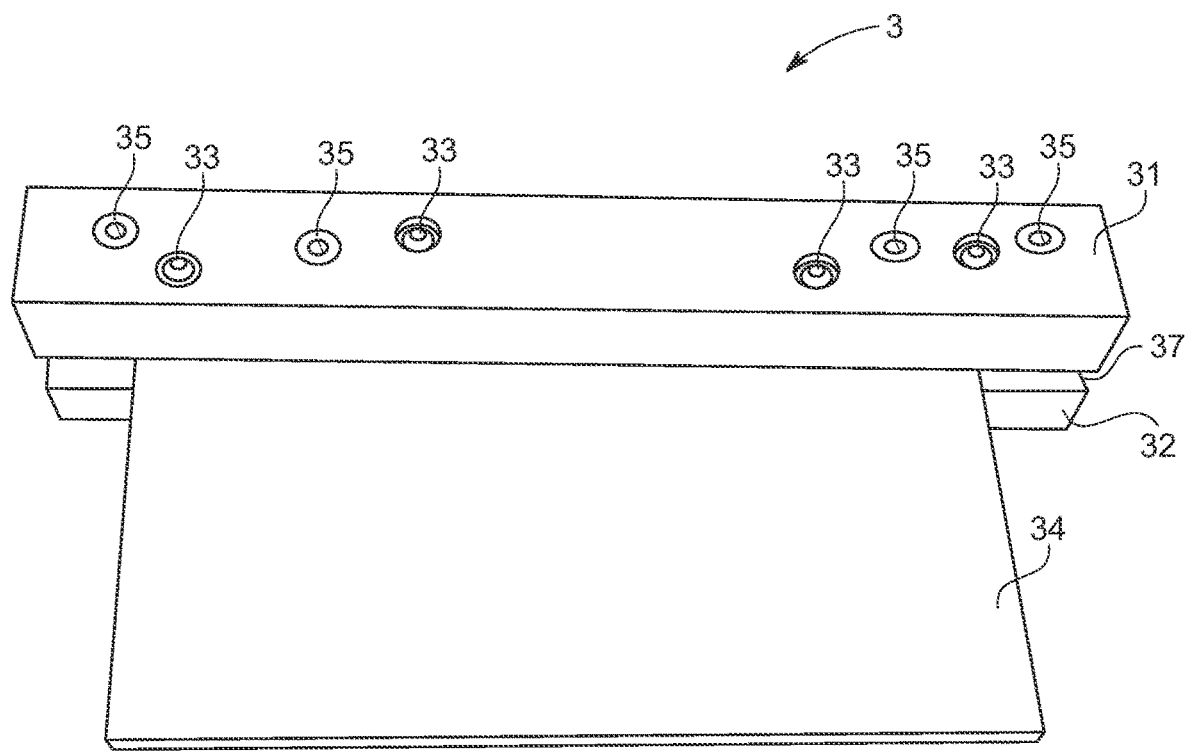
FIG. 3 shows another embodiment of a flooring tool of the disclosure.

FIG. 3 shows another embodiment of a flooring tool 3 of the disclosure. FIG. 3 shows a block member 31 and block member 32 attached via screws 33 with gap 37. Screw holes 35 may be used to position the screws at different locations in the block members in order to accommodate various flooring pieces. FIG. 3 shows flooring piece 34 attached to flooring tool 3.

Figure 4:
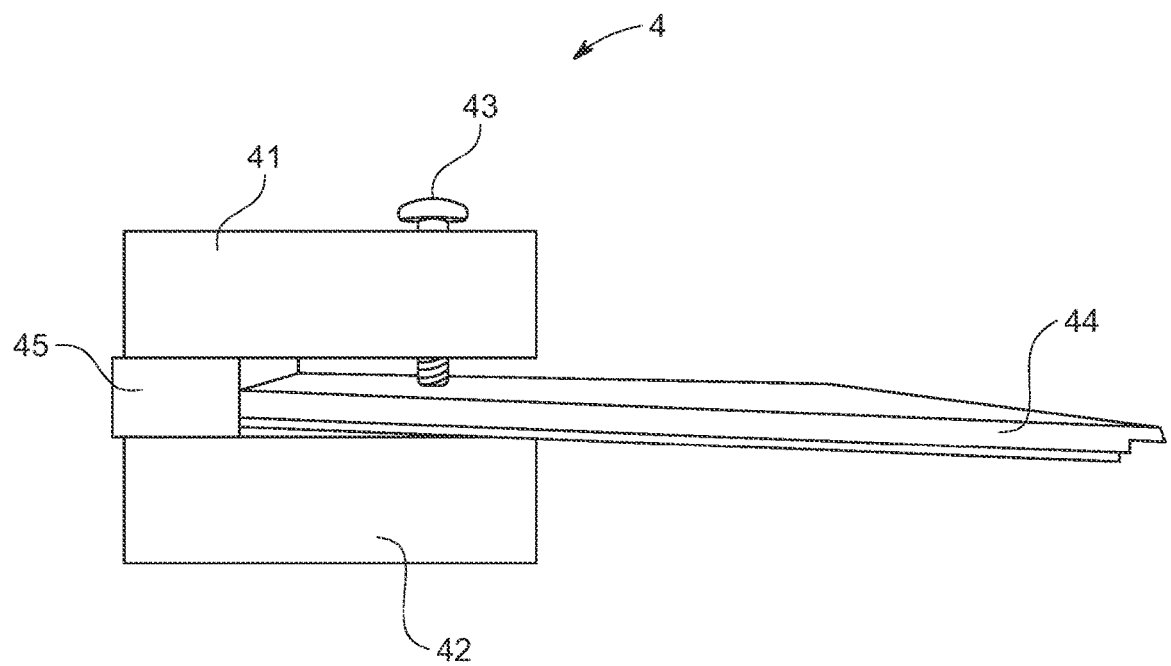
FIG. 4 shows a side view of an embodiment of a flooring tool of the disclosure.

FIG. 4 shows a side view of an embodiment of a flooring tool 4 of the disclosure. FIG. 4 shows block members 41, 42, and 45. FIG. 4 should also shows attachment screws 43. FIG. 4 shows flooring tool 4 holding flooring piece 44. As also mentioned above, either two or all three of block members 41, 42, and 45 may also be integrally formed as one piece.

Figure 5:
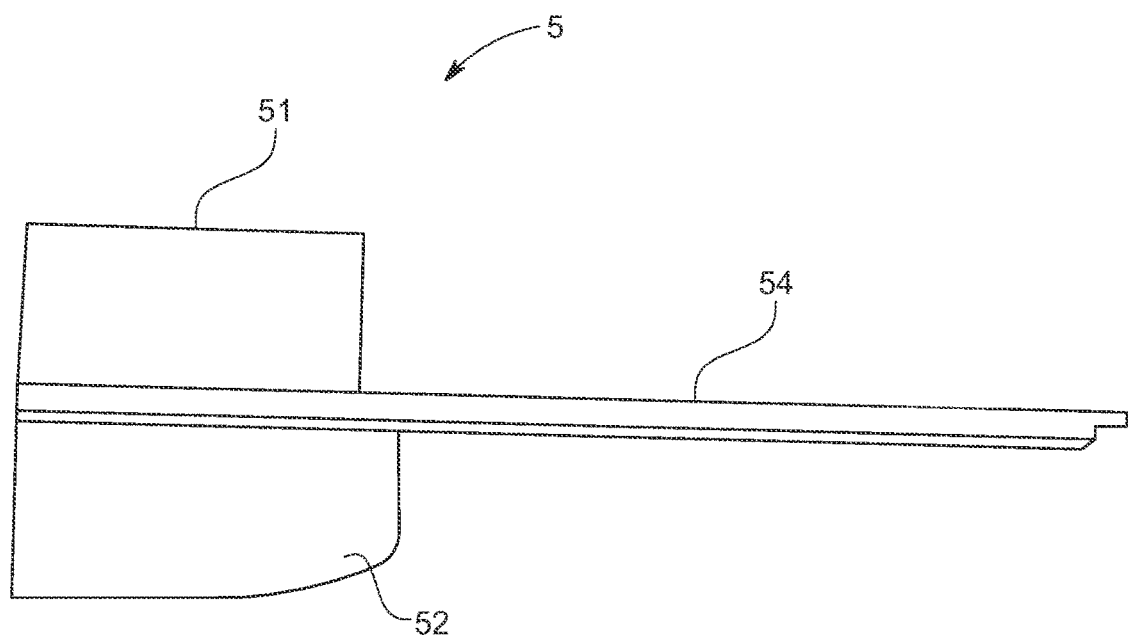
FIG. 5 shows another side view of an embodiment of a flooring tool 5 of the disclosure.

FIG. 5 shows another side view of an embodiment of a flooring tool 5 of the disclosure. FIG. 5 shows flooring tool 5 with block members 51 and 52 holding a piece of flooring 54.

Glossary

A flooring piece or scrap generally includes laminate, wood, and vinyl flooring pieces, scraps, planks, squares, or rectangular shaped flooring pieces that are fitted together to form a floor during installation. For example, there may be tongue in groove connections which allow the flooring pieces to be connected together. The flooring includes snap-on laminate flooring. See e.g., Laminate Flooring, Wikipedia, the free encyclopedia, last edited 10 Oct. 2021, herein incorporated by reference.

As also discussed elsewhere, attachments, as used herein, can include screws, nails, clamps, glue, quick release fasteners, including hand turn fasteners and screws and thumbscrews.

As also discussed elsewhere, a gap or a slot is generally a space in the flooring tool sufficient to accommodate a flooring piece. In embodiments, the various members of the tool may be integrally formed and thus form a slot to accommodate the flooring piece. The gap may range from about ⅛ inch to about 1.5 inches sufficient to accommodate standard flooring pieces. The gap may preferably be between ⅓ of an inch and 1 inch wide.

The gap may be variable in width. In embodiments, the screws or attachment mechanisms may decrease the width of the gap or slot in order to hold a scrap or piece of flooring. In embodiments, the gap between the block members may have a fixed width and the screws or attachment mechanisms may be used to hold the scrap or piece of flooring in place.

Block members as used herein are generally solid and made of wood, plastic, composite, metal, laminate, or any other material capable of accepting blunt force sufficient to seat the flooring pieces together. The block members may have approximately the same dimensions (length, thickness, width) but may also be of different sizes. For example, one block member may be wider or thicker than the other. The various block members described herein may also be integrally formed.

In embodiments, the block members extend a certain amount along a length or with of a flooring piece. That is, when a flooring piece is attached to the flooring tool, the block members are disposed on each side of the flooring piece. This is illustrated, for example, in FIG. 2, FIG. 4, and FIG. 5 where the block members extend several inches on each side of a flooring piece. Preferably, the block members will extend about 2 to 6 inches or about 2 to 4 inches along each side of an attached flooring piece.

The length of a block member may range from about 4 inches to about 20 inches. In embodiments, the range may be about 6 inches to 12 inches long. The width may range from about one half an inch to about 6 inches, preferably, from about ½ inch to 3 inches. The depth may range from about 1 inch to about 6 inches, preferably about 2 to 4 inches.

Integrally formed means the block members are connected together so as to form essentially one piece. For example, if the block members were made from a plastic material, the block members could be molded and formed as one piece. Similarly, if the block members are made from wood, block members could be made from essentially a single piece or block of wood with a gap or slot contained therein.

The dimensions of the block members can be defined as length, width, and depth. For example, in FIG. 1 the length would be the dimension running vertical along the flooring piece. The depth would be the dimension perpendicular to the length and perpendicular to the plane of the attached flooring piece. The width would be the dimension in the direction of screw travel.

EXAMPLE

In one example, a flooring tool includes two block members that are each approximately 10" long; 3" deep; and 1½" wide. A gap is present between the block members that can vary between about ¼ inch and 1 inch wide. The two block members are made of wood and attached to each other with screws. One or more screws are also used to hold a piece of flooring in place in the gap. The flooring tool attaches to a scrap of snap together flooring, being installed, exposing the side of the mechanical fastener that fits into the mechanical edge on the floor being installed. The flooring tool can accept blunt force to the block members to seat the flooring piece into the flooring. The flooring tool will protect the integrity of the scrap flooring piece that is being attached or seated and prevent any blunt force trauma to the flooring piece.

While this disclosure includes specific examples, it will be apparent after an understanding of the disclosure of this application has been attained that various changes in form and details may be made in these examples without departing from the spirit and scope of the claims and their equivalents.

The invention claimed is:

1. A method of seating a snap on laminate flooring piece of a plurality of snap on laminated flooring pieces into a previously installed snap on laminate flooring piece with a flooring tool, the flooring tool comprising:

providing two block members having a length and a width, and each attached to the other block member, wherein one of the two block members comprise one or more screw holes each for a corresponding screw, hand screw, thumb screw or turn fastener, and the other block member does not include screw holes, a spacer disposed between the two block members configured to maintain a gap between the two block members, wherein the gap is between about ⅛ inch and about 1.5 inches wide, wherein the two block members are between about 8 inches to about 24 inches long, about 1 inch and 6 inches wide, and about 1 inch to about 6 inches thick;

attaching one of said plurality of snap on laminate flooring pieces to the block members by placing the snap on laminate flooring piece in between the two block members and inserting or screwing one or more of the screws, hand screws, thumb screws or turn fasteners through the one or more screw holes to hold the snap on laminate flooring piece in place; and applying blunt force on the flooring tool to seat another snap on laminate flooring piece into a previously installed snap on laminate flooring piece.

2. The method of claim 1, wherein the block members comprise wood, plastic, metal, carbon fiber, or composite.

3. The method of claim 1, wherein the spacer is attached to both block members with glue.

4. The method of claim 1, wherein the two block members of the flooring tool are approximately the same height, length, and width.

5. The method of claim 1, wherein the two block members and the spacer of the flooring tool are integrally formed.

* * * * *